United States Patent

[11] 3,577,886

[72] Inventor John R. Wiese
 Dresher, Pa.
[21] Appl. No. 865,876
[22] Filed Oct. 13, 1969
[45] Patented May 11, 1971
[73] Assignee Leeds & Northrup Company
 Philadelphia, Pa.

[54] DEVICE FOR IMMERSION IN MOLTEN MATERIAL TO SAMPLE AND/OR MEASURE TEMPERATURE
 2 Claims, 1 Drawing Fig.

[52] U.S. Cl. .................................................. 73/425.4
[51] Int. Cl. ...................................................... G01n 1/12
[50] Field of Search ............................................. 73/421
 (MM); 136/234

[56] References Cited
 UNITED STATES PATENTS
 3,321,978 5/1967 Jackson ..................... 73/421
 3,463,005 8/1969 Hance ....................... 73/421

Primary Examiner—S. Clement Swisher
Attorney—Woodcock, Washburn, Kurtz & Mackiewicz ABSTRACT: A device for immersion in molten material for obtaining a sample and/or measuring the temperature. For obtaining a sample the device is comprised of a body structure including a cavity for reception of a sample of molten material. An entrance to the cavity may be closed by a fusible cap. The body structure is supported at the immersion end of a protective cardboard tube. A handle extending into the cardboard tube is employed to immerse the body structure in a bath of molten material. The device may or may not include one or more heat sensing devices for measuring the temperature of a sample as it cools and/or for measuring the temperature of the bath of molten material from which a sample may be taken. The device of this invention is characterized by the inclusion of a heat shielding protective enclosure surrounding the immersion end. The enclosure is automatically separable from the device upon immersion in a bath of molten material and moves away from its shielding position.

Patented May 11, 1971        3,577,886

DEVICE FOR IMMERSION IN MOLTEN MATERIAL TO SAMPLE AND/OR MEASURE TEMPERATURE

BACKGROUND OF THE INVENTION

1. Field of the Invention

Applicant's invention is for an improved assembly useful in the fields of measuring and testing wherein a liquid sample is collected and/or a heat sensor may be included to measure the temperature of the bath of molten material and/or a heat sensor may be included in a sample cavity to respond to the temperature of the sample as it cools.

2. Description of the Prior Art

As indicated in U.S. Pat. Nos. 2,769,074, 3,011,005, and 3,306,783 it has heretofore been known to use a cardboard or paper protective cap for temperature measuring devices to be immersed in a bath of molten material thereby to protect the immersion end of such devices prior to use and prevent damage to the heat sensing portion thereof until the device has been immersed to a desired subsurface level in the material the temperature of which is to be measured. Protective elements of cardboard, paper and the like have certain drawbacks in that if they are made of lightweight material they are apt to burst into flames and be consumed prior to complete performance of their desired function. If such protective devices are made of heavier paper or cardboard in order to avoid burning up before they have served their intended function, they tend after immersion to resist destruction since the supply of oxygen is eliminated by immersion in a bath of material and for an objectionably long time they serve to prevent access of the molten material to the sensing device.

U.S. Pat. Nos. 2,999,121 and 3,038,951 to H. G. Mead and additionally U.S. Pat. Nos. 3,024,295, 3,048,642 and 3,298,874, are all patents related to pyrometry by means of devices to be immersed in a molten material. These devices are illustrative of many satisfactory forms of expendable immersion heat sensing assemblies each of which employs a fusible metal cap as the protective device. U.S. Pat. No. 3,455,164—G. P. Boyle is illustrative of several forms of a sampler for immersion in a bath of molten material for collection of a sample useful for analysis. Most of the modifications disclosed therein additionally include means for measuring the temperature of a sample as it cools.

When devices of the type described in the several patents referred to above first came into being they were used primarily in open-hearth furnaces, electric furnaces, ladles, and the like. In more recent years they have been widely used in basic oxygen furnaces wherein an entirely different set of operating conditions exists. In basic oxygen furnaces the distance from the entrance of the furnace to the surface of the molten material contained therein may be anywhere from 15 to 40 feet depending upon the angle at which the furnace is tipped. This distance is many times that encountered in most open-hearth furnaces. Additionally, the slag layer over a bath of molten metal in a basic oxygen furnace instead of being a few inches deep is apt to be 2 or 3 feet deep. While working with basic oxygen furnaces it has been found that expendable immersion temperature measuring devices usually operate satisfactorily in spite of the great distance from the mouth of the furnace to the surface of the bath of molten material. However, under the severe long path, high-temperature conditions encountered in a basic oxygen furnace it has been found that immersion samplers have not heretofore been made to operate with uniform success. Many of the samples obtained are contaminated with slag and therefore unsuitable for use in making a chemical analysis of the molten material or for obtaining a cooling curve from which may be found the carbon content of the material of the bath. It appears evident that the contamination of the sample results from premature destruction of the fusible cap which is preheated to an intolerable degree during traverse of the sampler through a hot zone of extended length which exists in a basic oxygen furnace.

Applicant has discovered that the provision of a heavier fusible cap for a sampler of the type disclosed in the above-mentioned patent to Boyle is not a satisfactory solution to the problem due to excessive preheating of the entrance portion of the sampler because the high heat conductivity and the radiant energy given off by a close fitting metal cap at an elevated temperature. He has, however, found that a protective structure preferably of cardboard or other material which forms a heat shield may be usefully employed in a manner such that acceptable samples can be obtained by making such protective structure automatically separable subsequent to its contact with the molten material in a furnace. Upon separation the shield will automatically move out of the way.

While it has been known, as clearly taught in copending U.S. Pat. application, Ser. No. 514,961, filed Dec. 20, 1965, by K. B. Parker, Jr., to secure a loose fitting cardboard tube to the weight structure of a "throw-in" expendable immersion thermocouple by means which disintegrates, melts, or the like during travel of the weight structure through an atmosphere at high temperature toward a bath of molten material, there is no suggestion therein of the problem solved by applicant nor any suggestion of selecting a heat destructible means which will provide support until acted upon by the molten material of the bath.

SUMMARY OF THE INVENTION

In accordance with applicant's invention there is provided a device for immersion in molten material, particularly a sampler useful in connection with sampling steel in a basic oxygen furnace. The device includes an immersible end portion to which is affixed a separable heat shielding protective structure held in protective relation with the immersible end portion by heat destructible means which resists separation until acted up by the molten material of the bath.

Further, in accordance with applicant's invention a device in the form of an immersion sampler will include an immersible body structure having therein a cavity with an entrance portion for reception of a sample of molten material. A separable heat shielding protective structure is supported in surrounding relation with respect to the entrance portion by heat destructible means until acted upon by the molten material of the bath in a manner effecting separation of the heat shielding protective structure.

More specifically, in accordance with applicant's invention, an immersion sampler of known type including a body structure having therein a cavity with an entrance portion for reception of a sample of molten material is supported in the immersion end of a cardboard tube. The complete unit is characterized by the inclusion of a cardboard tube extension the immersion end of which is closed by a perforated cardboard cover surrounded by a fusible metal cap. This cardboard tube extension is affixed in abutting relation to the cardboard tube which supports the body structure by means of a heat destructible paper tape which seals the joint between the cardboard tube and the tube extension until acted by the bath of molten material which effects separation of the tubes.

DESCRIPTION OF THE DRAWINGS

For an understanding of applicant's invention the following specification and claims should be read while referring to the single FIGURE of drawing wherein:

DESCRIPTION OF PREFERRED EMBODIMENTS

Figure 1:
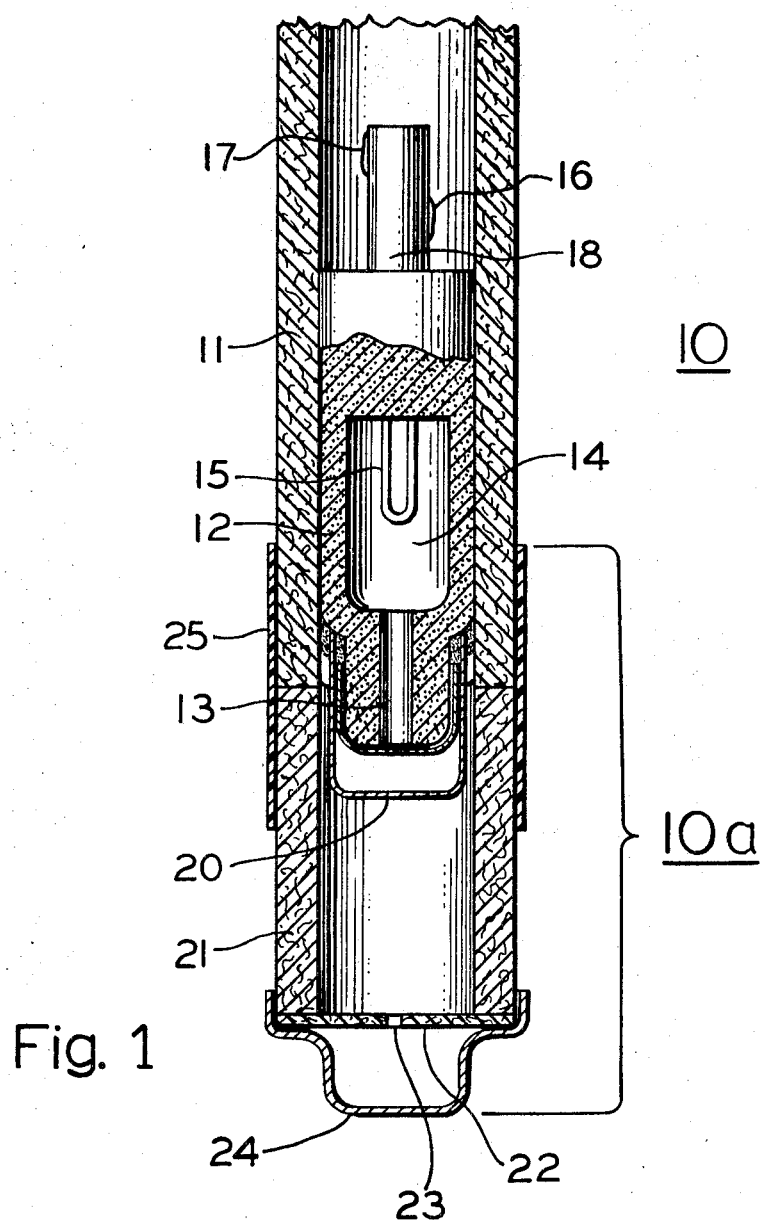
FIG. 1 is a side elevation partly in section showing the construction of an immersion sampler of known type with additional protective means in accordance with applicant's invention.

Referring to FIG. 1, there is shown an immersion sampler assembly 10 of a type more fully described and claimed in the above-mentioned Boyle patent which is assigned to applicant's assignee. This unit 10 is comprised of an outermost housing which desirably is a heavy walled cardboard tube 11. Supported at the immersion end of tube 11 is a body element 12 having an entrance passage 13 which provides for passage of molten material into a sample cavity 14. The diameter and length of the entrance passage 13 is such as to effect rapid freezing of the sample of molten material therein soon after the cavity 14 has been filled thus to retain the sample of molten material in cavity 14 during cooling thereof. A thermocouple structure 15 projects into cavity 14. This thermocouple is connected within the body structure 12 to leadwires having bent-back portions 16 and 17 which overlie a tubular portion of resilient insulating material 18 supported by and projecting from the body 12. The immersion end of the body structure 12 is covered by a fusible metal cap 20. The heat sensing assembly comprised of the thermocouple structure 15 is by means of the lead wires connectable to a measuring circuit, in a manner not shown here but clearly described in several of the aforementioned patents, so that a cooling curve may be plotted as the molten sample in cavity 14 cools.

The sampler assembly 10 and its use briefly described above is clearly and completely described in many of its useful forms in U.S. Pat. No. 3,455,164—G. P. Boyle assigned to applicant's assignee. This structure per se forms no part of the present invention and further description of its many possible forms is deemed unnecessary.

In abutting relation to the tube 11 is an extension tube 21 which is desirably of cardboard of the same wall thickness as that of the tube 11. This extension tube 21 may be 3 or more inches in length. The precise length per se is not critical. It is closed by a cardboard end plate 22 about three thirty-seconds inch thick. This plate has a single hole or perforation 23 centrally thereof to permit the escape of air. The cardboard end plate 22 may be separately secured to the end of the cardboard tube 21 by a suitable cement or may be clamped in place by means of a metal cap 24 which serves to protect the cardboard elements before and during initial insertion into the molten material. Cap 24 may be of a material similar to that of the fusible metal cap 20 mentioned above. The tube 21, plate 22, and cap 24 together form a heat shielding protective structure 10a.

In order to retain the cardboard tube portion 21 of structure 10a in abutting relation to the cardboard tube 11 of assembly 10 there is provided a joint sealer and connector 25. The joint sealer or connector 25 in the form illustrated is comprised of an adhesive coated heavy paper tape with a cord running longitudinally thereof. Such tape is widely used to close shipping cartons. A suitable tape is one identified as 3 inch T/D Trojan Asphaltic Rayon Cord Reinforced Longitudinal Strand, Glass Reinforced Diagonal Strand Tape, manufactured by the St. Regis Paper Company, Troy, Ohio. Other materials may be used for the joint sealer and connector 25 as long as the material selected will hold the heat shielding protective structure 10a comprised of parts 21, 22, and 24 in place while the sampler assembly 10 passes through the hot zone of a furnace above the surface of the bath of molten material. It is further necessary that the materials for the joint sealer and connector be selected so that upon entry of the extension tube 21 into the denser medium of liquid slag the joint sealer 25 will have become, or will quickly become so weak, or otherwise caused sufficiently to disintegrate, that the extension tube 21 will break away from tube 11. When the tube 21 breaks away, it will float to the surface of the bath where oxygen is available and be consumed. Upon separation of the auxiliary protective elements the fusible cap 20 which until then has been protected from the intense heat of the furnace will soon melt away, however, by this time the immersion end of the sampler will be below the slag level and into the bath so that only pure sample can enter the sampler device.

As will be readily recognized, applicant's invention is applicable for shielding the immersion end of many devices from gaseous environments at high temperature prior to contact with the denser medium of a molten liquid and is clearly useful with sampler devices of many configurations and immersion temperature measuring devices. Without deviation from the principals of applicant's invention many different materials may be utilized in the practice thereof.

I claim:
1. A device for immersion in a molten material for collecting a sample thereof comprising:
   an immersible body structure having therein a cavity with an entrance portion for reception of a sample of molten material,
   a fusible closure covering said entrance portion,
   a tubular housing supporting said body structure and its fusible closure at an immersion end thereof,
   a separable heat shielding protective structure having a configuration to form an extension of said tubular housing, and
   heat destructible means at adjacent ends of said tubular housing and said heat shielding protective structure to secure said heat shielding protective structure in surrounding relation with said fusible closure during passage through a zone at elevated temperature above said molten material, said heat destructible means, however, being separable by action of said molten material in a manner effecting separation of said heat shielding protective structure for movement thereof away from its heat shielding position.

2. A device according to claim 1 wherein said heat destructible means is a band of paper tape adhesively secured to adjacent ends of said tubular housing and said protective structure.